L. F. & J. C. SIMPSON.
AUTOMOBILE SIGNALING DEVICE.
APPLICATION FILED JAN. 20, 1916.

1,248,938.

Patented Dec. 4, 1917.

WITNESSES:
Warren P. Smith.
J. M. Griffin.

INVENTORS,
Louis F. Simpson
John C. Simpson,
BY
Fitzenberg
ATTORNEY

UNITED STATES PATENT OFFICE.

LOUIS F. SIMPSON AND JOHN C. SIMPSON, OF PORTLAND, OREGON, ASSIGNORS TO THE NATIONAL AUTOMOBILE SIGNAL COMPANY, A CORPORATION OF WASHINGTON.

AUTOMOBILE SIGNALING DEVICE.

1,248,938.  Specification of Letters Patent.  Patented Dec. 4, 1917.

Application filed January 20, 1916. Serial No. 73,230.

*To all whom it may concern:*

Be it known that we, LOUIS F. SIMPSON and JOHN C. SIMPSON, citizens of the United States, residing in the city of Portland, county of Multnomah, and State of Oregon, have invented certain new and useful Improvements in Automobile Signaling Devices, of which the following is a specification.

Our invention relates to automobile signaling devices, such as are adapted to indicate to the driver of a following vehicle the proposed action of a preceding automobile, or other vehicle, that is, whether such preceding automobile, or other vehicle, is going to turn to the right or to the left, or is going to stop. It is a common practice for the driver to signal when about to turn to the right or left by holding out his hand on that side of the vehicle toward which he will turn, or to raise his hand before applying the brakes to stop the vehicle. Either of these movements warns the driver of a following vehicle, and, if the signals are given in time, frequently serves to prevent an accident. Drivers do not, however, always give these signals, and the result is that collisions frequently occur. Automatic signals have been devised which are controlled by movements of the steering or brake mechanisms, such signals being designed to warn following vehicles when preceding vehicles turn, or stop; but all of these devices, so far as I am aware, have no provisions for insuring the operation of the signal with sufficient promptness to enable the following vehicle to avoid a collision when it is very near the vehicle displaying the signal, as the signal is not moved before the turning movement is practically completed, or the vehicle has been brought to a stop.

An important characteristic of our invention consists in the provision of operating means that insures the completion of the signal movement during the initial part of the movement of said means, which represents a small portion of its entire movement, thereby warning the following vehicle in time to permit the driver to apply his brakes, or to turn the vehicle and avoid a collision. The remaining portion of the movement of the operating means, after the signal has been moved, is expended as lost motion while the signal remains set in the position in which it was placed to indicate the direction that the vehicle has turned, or to indicate a stop.

The principal object of our invention is to provide an improved mechanism for operating such a signaling device, whether that device be operated automatically by the movement of the steering mechanism, by the brake lever, or by the reverse lever, the main object being to provide improved operating connections therefrom to the signaling device, capable of effecting prompt, or advance movement of the signaling device, and of also compensating for the difference between the movement required for said device and the movement of the controlling member from which it is operated, whether it be the steering mechanism, brake lever, or reverse lever.

In order that others may understand our invention, we have illustrated the same in the accompanying sheet of drawings, which we will now describe.

Figure 1:
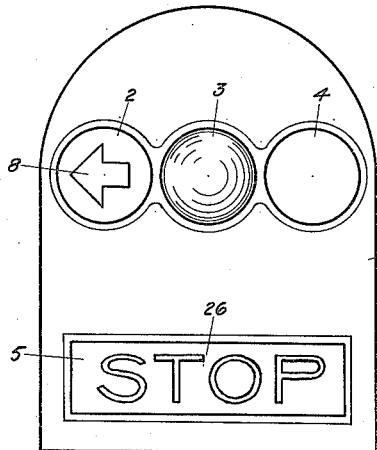
Figure 1 is a face view of a signaling device embodying our invention.
Figure 2:
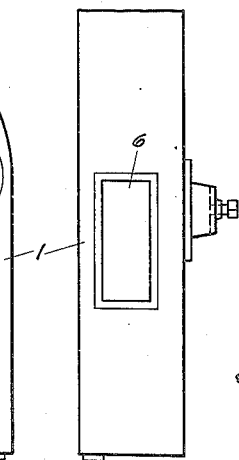
Fig. 2 is an edge view thereof.
Figure 3:
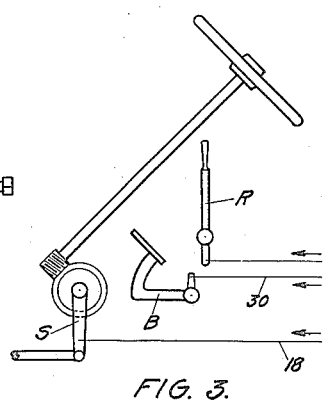
Fig. 3 is a diagrammatic view showing the usual steering mechanism, a brake lever and a reverse lever, with operating connecting lines therefrom for operating the signaling devices.
Figure 4:
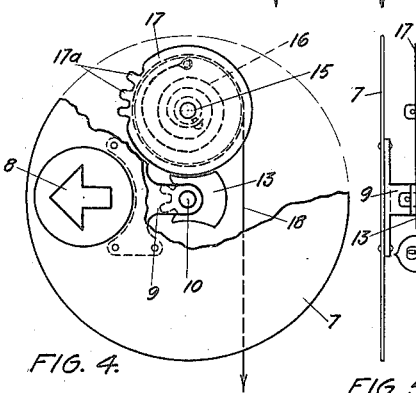
Fig. 4 is a face view of a revoluble disk, with a portion thereof broken away to show a spring-actuated intermittent gear mechanism for operating the same within the casing.
Figure 5:
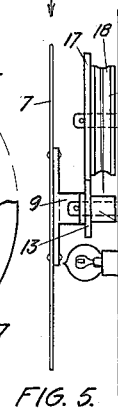
Fig. 5 is an edge view thereof.

Referring now more in detail to the drawings, the case, or housing, 1, of our invention, may be of any desired shape, but is preferably as small and compact as possible. It is provided in its face with three openings, 2, 3 and 4, the middle opening being a lens-covered opening. Said casing is also provided in its face with a "stop" signal opening 5, and at its opposite sides, or edges, with glass covered openings, as 6. Rotatably mounted within said casing 1, is a revoluble disk member 7, provided at one side with a signal arrow-head 8, said disk being provided with a supporting member 9, mounted upon a supporting axle, or pin, 10, in the back wall 11, of the casing, as indicated in Figs. 4 and 5. Mounted upon said supporting pin, or axle, 10, is a hub-like member 12, provided with an intermittent gear 13, shown in face view in Fig. 4, and in edge view in Fig. 5. Rotatably secured to the back wall 11, of said casing, or housing, is a spring-actuated drum-like pulley 14, mounted upon a pin 15, and provided therein with a coiled spring, as 16, one end of which is secured to said drum 14, and the other end of which is secured to said pin 15, in a manner well understood. Secured to said drum is an intermittent gear disk 17, adapted to have operating engagement with the intermittent gear 13. An operating cable 18, runs from said drum 14, out through the bottom of the casing, as indicated in Figs. 1 and 4, and is extended to and connected with a part of the steering mechanism, as indicated in Fig. 3, whereby as said steering mechanism is operated to turn the machine to the right or to the left, it automatically takes up, or pays out, said operating cable and operates said drum 14, and said intermittent gear member 17, during the operation of which the teeth 17ª, on the intermittent disk 17, engage the toothed portion of the intermittent gear 13, whereby to operate the same a partial turn, thus revolving the disk member 7, so as to move the arrow-head thereon into and out of register with either of the sight openings 2 and 4. It will be noted that the intermittent disk 17, can turn in opposite directions, with a sliding and holding engagement with the gear 13 while the teeth of the gears are out of mesh, without turning the latter. This provides lost motion between the movement of the steering mechanism, and the short movement required for turning the signaling device so as to bring the signaling arrow into register with one or the other of the sight openings 2 and 4. In normal position the gear teeth of the disk 17 would be in mesh with the toothed portion of the gear 13, and the signal disk 7, would be held in a position with the arrow-head pointing up, or out of register with the sight openings 2 and 4. When the steering mechanism is operated to turn the machine to the right or to the left, the drum 14 is operated either by pull on the operating cable 18, against the tension of the spring 16, or is operated by the spring in the opposite direction as the cable is released. In either case, the initial movement of the steering mechanism will, through the action of the gear teeth, immediately rotate the disk through one quarter of a revolution and locate the signaling arrow, or other device, in register with the opening 2 or 4, and the teeth will then move out of mesh. This action will occur upon the first portion of the movement of the steering mechanism, so that the signal will be instantly positioned to warn a following vehicle. Thereafter the teeth of the gears will be out of mesh, and the smooth part of the gear 17 by engaging the concave portion of the gear 13 will lock the latter and the disk 7 against further rotation during the remaining, and greater, portion of the movement of the steering mechanism. The same operative functions of the parts take place when the steering mechanism is moved in either direction.

Figure 6:
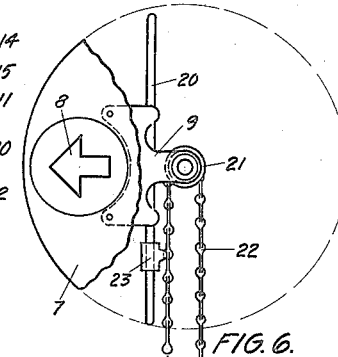
Fig. 6 is a face view of a revoluble disk, showing a modified form of operating mechanism therefor.
Figure 7:
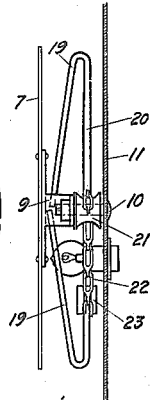
Fig. 7 is an edge view thereof.

In Figs. 6 and 7, a modified form of operating the signal disk 7, is shown. Instead of intermittent gears, as shown in Figs. 4 and 5, the supporting member 9, is provided with a wire loop 19, having a straight portion 20, the ends of which loop are secured to the supporting member 9, which carries the signal disk 7. Instead of an intermittent gear, as 13, the supporting pin is provided with a chain pulley 21, over which runs an operating chain 22. Secured to the chain is a slide collar 23, clearly shown in Fig. 6, slidably mounted upon the straight portion 20, of the wire loop 19. The chain pulley 21, turns loosely upon the supporting pin 10, in the back wall 11, of the housing, thus allowing for certain movement of the operating chain 22, which would be connected for operation, preferably from the steering mechanism in any desired manner, so that as said steering mechanism is turned in one direction or the other, said chain would also be run in one direction or the other, said chain turning freely with its pulley 21, until the sleeve member 23, has reached its upper limit, or its lower limit, whereupon in order to permit the chain to move further, it must pull the wire loop member 19, with it, and thereby turn the signal disk 7, from one side to the other to bring the arrow 8 into register with one or the other of the signal openings 2 and 4.

In Fig. 6, the chain is shown turned to the extreme left, turning the wire loop 19, and the disk so as to put the arrow 8 in the left sight opening 2. Normally the straight portion 20 of the wire loop 19, would stand horizontally in the casing above the chain pulley 21, with the arrow directed upwardly. Initial movement of the operating chain 22 in either direction, would turn the disk to its indicating position, and the length of the wire member 20, would permit the chain to be moved further, the operating sleeve 23 sliding on the wire 20.

Figures 8, 9:
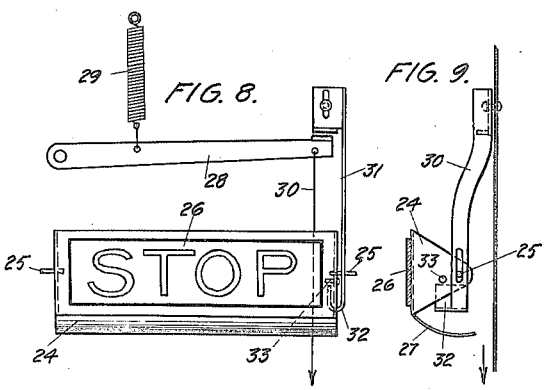
Fig. 8 is a face view of a "stop" signaling member, with an operating mechanism therefor, embodying our invention.
Fig. 9 is an end view thereof.

In Figs. 8 and 9, we have shown the invention as applied for operating a "stop" signal, designated 24, pivotally mounted at its ends, as at 25—25, having a "stop" sign 26, on its flat face, and a curved closure portion 27, adapted to be normally held over the opening 5, in the casing 1. A spring-lifted lever 28, is normally held raised by means of a spring 29, and has attached to its movable end an operating cable 30, which would extend to and be connected with the brake lever B. An operating member 31, has a slot connection over the pivot pin 25, at one end of said stop member, and is provided with an up-turned hook portion 32, adapted when raised to engage a pin 33, in the end of said signal member, whereby to lift said signal member so as to bring the curved closure portion 27, over the stop opening 5, in the casing. Normally, said stop device tends to turn by gravity to bring the stop sign 26, into the stop opening 5, it being held in the non-stop position by the spring 29, and the lever 28, which holds the operating member 31, in its up position. When the brake lever B, is operated to stop the car, the cable 30, is during the initial movement of the brake lever, drawn so as to draw the lever 28, downwardly, and thereby permit the stop sign to turn immediately by gravity into stop position, the member 31, moving downwardly by gravity therewith. The remaining portion of the movement of the brake lever merely lowers the lever 28 and stretches the spring 29 without affecting the position of the stop sign. When the brake is released the spring 29, lifts the lever 28, and the member 31, thereby turning the stop device 24, into a raised, or non-exposed, position.

Figures 10, 11:
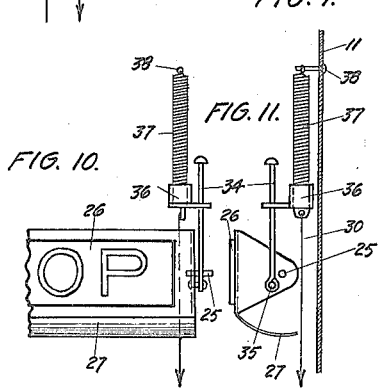
Fig. 10 is a fragmentary view similar to Fig. 8, showing a modified form of operating mechanism.
Fig. 11 is an end view thereof.

In Figs. 10 and 11, a modified form of operating mechanism is shown. The "stop" device is pivotally mounted on the pins 25, as before, and a lifting rod 34, is attached to the end of said "stop" device, as at 35. Said lifting rod 34, is operated by means of a member 36, attached to the lower end of a spring 37, supported at its upper end by a pin 38, in the back wall 11, of the casing, and at its lower end attached to an operating cable 30. As the brake B, is set, the operating cable is drawn, drawing downwardly on the spring 37, thereby allowing the stop signal to move by gravity into the stop position, as indicated in the figures. As the brake B, and the operating cable 30, are released, the spring 37, lifts the member 36, and through the rod 34, lifts the signal device into a non-exposed position.

It will, therefore, be seen that in all of these signal operating devices, no matter which form thereof is used, and no matter whether they be operated by the steering mechanism, or by the brake mechanism, there is a compensating operating connection therebetween, which after the signal device is moved into warning position upon initial movement of the operating member permits lost motion between said member and the signal device during the remaining portion of such movement.

We are aware that many changes in details can be made in our invention as here shown and described without departing from the spirit thereof, and we do not, therefore, limit the invention to the particular embodiments thereof here shown, except as we may be limited by the hereto appended claims.

We claim:

1. In an automobile signaling device, a casing with signal openings therein, a signaling device movably mounted within said casing and adapted to be moved into and out of register with either of said openings, operating connections from said signaling device to controlling means for said automobile whereby movement of said controlling means moves said signaling device, and means interposed in said connections to insure that said signaling device shall complete its movement during the initial movement of the controlling means and to permit the controlling means to thereafter continue in operation without effect upon the signaling device.

2. A signaling device for automobiles comprising, in combination, a casing having signal openings therein, a signaling device revolubly mounted within said casing and adapted to be moved into and out of register with said openings, operating connections from said signaling device to controlling means for said automobile, and compensating means comprising intermittent gears interposed in said connections, whereby initial movement of the controlling means moves said signaling device into register with a signal opening in the casing without interfering with the further movement of said controlling means.

3. A signaling device for automobiles, comprising a casing with signal openings therein, a signaling device revolubly mounted within said casing and adapted to be moved into and out of register with said openings, means for stopping said signaling device when it has been moved into register with either of said openings, operating connections from said signaling device to controlling means for the automobile, and means acting positively, to cause the signaling device to register with one of said openings during the initial movement of said controlling means and for holding said device in such position while said controlling means completes its movement.

4. An automobile signaling device adapted to be operated from controlling means for the automobile, comprising, in combination, a casing having a signal opening therein, a revoluble signaling device mounted within said casing and adapted to be moved into and out of signaling position relative to said opening, intermittent gears constructed and arranged for operating said signaling device during the initial movement of said controlling means, and to permit said means to complete its movement without further operating said device, and an operating connection from one of said gears to said controlling means.

5. A signaling device for automobiles operable from controlling means therefor, comprising, in combination, a casing having a signal opening therein, a revoluble signaling device mounted in said casing and adapted to be moved out of and into signaling position relative to said signaling opening, intermittent gears for operating said signaling device during the initial movement of the controlling means, said gears having interengaging surfaces formed for locking the signal in signaling position and permitting the controlling means to complete its movement without further moving the signal.

6. A signaling device for automobiles operable from controlling means therefor, comprising, in combination, a casing having a signal opening therein, a revoluble signaling device mounted in said casing and adapted to be moved out of and into signaling position relative to said signaling opening, a mutilated gear having curved locking surfaces and connected with said signaling device, a mutilated gear having teeth to mesh with the first-named gear and a portion to engage the curved locking surface thereof, said gear connected with the controlling means of the automobile, the parts being so constructed and arranged that the signaling device is operated during the initial movement of the controlling means while the teeth of said gears are in mesh and is held in signaling position by the engagement of the locking portions of said gears during the remaining part of said movement.

Signed at Portland, Multnomah county, Oregon, this 12th day of January, 1916.

LOUIS F. SIMPSON.
JOHN C. SIMPSON.

In presence of—
I. M. GRIFFIN,
J. C. STRENG.